US012405559B2

(12) United States Patent
Toriumi

(10) Patent No.: US 12,405,559 B2
(45) Date of Patent: Sep. 2, 2025

(54) FIXING DEVICE AND IMAGE FORMING APPARATUS

(71) Applicant: SHARP KABUSHIKI KAISHA, Sakai (JP)

(72) Inventor: Shun Toriumi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 18/624,835

(22) Filed: Apr. 2, 2024

(65) Prior Publication Data

US 2024/0337973 A1 Oct. 10, 2024

(30) Foreign Application Priority Data

Apr. 5, 2023 (JP) ................................ 2023-061368

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ....... G03G 15/2053; G03G 2215/2038; G03G 15/2064; G03G 2215/2035
See application file for complete search history.

(56) References Cited

U.S. PATENT DOCUMENTS

2007/0189818 A1* 8/2007 Kondo ............... G03G 15/2064 399/329
2008/0298862 A1* 12/2008 Shinshi .............. G03G 15/2064 399/324
2010/0092220 A1* 4/2010 Hasegawa .......... G03G 15/2064 399/328
2010/0202809 A1* 8/2010 Shinshi .............. G03G 15/2064 399/329
2010/0290822 A1* 11/2010 Hasegawa .......... G03G 15/2064 399/329
2011/0026988 A1* 2/2011 Yoshikawa ........ G03G 15/2053 399/329
2011/0052282 A1* 3/2011 Shinshi .............. G03G 15/2064 399/329
2011/0064437 A1* 3/2011 Yamashina .......... G03G 15/205 399/329
2011/0217094 A1* 9/2011 Hasegawa ............. G03G 15/20 399/329
2011/0229200 A1* 9/2011 Yamaguchi ........ G03G 15/2039 399/122
2012/0008971 A1* 1/2012 Lee .................... G03G 15/2064 399/328

(Continued)

FOREIGN PATENT DOCUMENTS

JP 2011-197019 A 10/2011
JP 2024148049 A * 10/2024

*Primary Examiner* — Sevan A Aydin
(74) *Attorney, Agent, or Firm* — ScienBiziP, P.C.

(57) ABSTRACT

A fixing device includes a fixing belt, a heat source, a fixing pad, and a support member. In the support member, a fixture and an upright are integrally formed, and the fixing pad is fixed in a rotation axis direction of the fixing belt. The upright is upright from a side opposite to the fixing pad in a width direction orthogonal to the rotation axis direction of the fixture, and a plurality of connections between the fixture and the upright is provided.

3 Claims, 13 Drawing Sheets

(56) References Cited

U.S. PATENT DOCUMENTS

| | | | | |
|---|---|---|---|---|
| 2012/0308254 | A1* | 12/2012 | Suzuki | G03G 15/2053<br>399/329 |
| 2013/0084111 | A1* | 4/2013 | Iwata | G03G 15/2053<br>399/329 |
| 2016/0011548 | A1* | 1/2016 | Utsunomiya | G03G 15/206<br>399/329 |
| 2016/0378027 | A1* | 12/2016 | Sawada | G03G 15/2053<br>399/329 |
| 2016/0378028 | A1* | 12/2016 | Fujiwara | G03G 15/2028<br>399/323 |
| 2017/0010570 | A1* | 1/2017 | Fujimoto | G03G 15/2053 |
| 2017/0185009 | A1* | 6/2017 | Yoshinaga | G03G 15/2042 |
| 2017/0255147 | A1* | 9/2017 | Seki | G03G 15/2053 |
| 2017/0261900 | A1* | 9/2017 | Sawada | G03G 15/206 |
| 2017/0364000 | A1* | 12/2017 | Seki | G03G 15/2053 |
| 2018/0011432 | A1* | 1/2018 | Yoshinaga | G03G 15/2042 |
| 2018/0017910 | A1* | 1/2018 | Sawada | G03G 15/2053 |
| 2018/0157198 | A1* | 6/2018 | Seto | G03G 15/2025 |
| 2018/0173138 | A1* | 6/2018 | Seki | G03G 15/2017 |
| 2018/0284663 | A1* | 10/2018 | Matsuda | G03G 15/2042 |
| 2018/0284669 | A1* | 10/2018 | Fujimoto | G03G 15/2053 |
| 2023/0251594 | A1* | 8/2023 | Yoshikawa | G03G 15/2064<br>399/328 |

* cited by examiner

FIXING DEVICE AND IMAGE FORMING APPARATUS

CROSS-REFERENCE TO RELATED APPLICATION

The present application claims priority from Japanese Application JP2023-061368, the content to which is hereby incorporated by reference into this application.

BACKGROUND OF THE INVENTION

1. Field of the Invention

The present disclosure relates to a fixing device and an image forming apparatus such as a copier, a multifunction peripheral, a printer, or a facsimile machine.

2. Description of the Related Art

FIG. 8 is a front view illustrating an example of a main part of a conventional fixing device 12X. FIGS. 9A and 9B are an exploded perspective view and a bottom view, respectively, illustrating an example of a support member 33X in the conventional fixing device 12X.

As illustrated in FIG. 8, the conventional fixing device 12X includes a cylindrical fixing belt 31, a heat source 36 that heats the fixing belt 31 inside the fixing belt 31, a fixing pad 34 that is in sliding contact with an inner surface 31*a* of the fixing belt 31, and a support member 33X that supports the fixing pad 34. In FIG. 8, the reference numeral 32 denotes a pressure roller.

Specifically, the support member 33X includes a first support 33X1 and a second support 33X2. The first support 33X1 and the second support 33X2 are formed into an L-shape in a front view (see FIG. 8). In the support member 33X, respective outer surfaces of the L-shaped first support 33X1 and the L-shaped second support 33X2 are overlapped with each other to form a T-shape in a front view.

In the conventional fixing device 12X described above, since the two supports are overlapped with each other, a large amount of heat transfers from the fixing belt 31 to the support member 33X through the fixing pad 34. Specifically, in the support member 33X, uprights 332X, which are upright from fixtures 331X to fix the fixing pad 34, are overlapped with each other, and the volume of the support member 33X is large, and therefore heat easily shifts from the fixtures 331X to the uprights 332X. As described above, when a large amount of heat transfers from the fixing belt 31 to the support member 33X through the fixing pad 34, the heat energy transmitted from the heat source 36 to the fixing belt 31 increases, and the power consumption increases accordingly.

In this regard, there is a conventionally known configuration in which a reinforcement member (support member) includes a pair of reinforcement portions (uprights) that are upright from both one end and the other end in a width direction orthogonal to a rotation axis direction of a fixing belt on the side opposite to a nip forming member (fixing pad) from a reinforcement recess (fixture).

SUMMARY OF THE INVENTION

However, in the conventional configuration, the configuration of the reinforcement member (support member) is complicated.

Thus, an object of the present disclosure is to provide a fixing device that includes a cylindrical fixing belt, a heat source that heats the fixing belt inside the fixing belt, a fixing pad that is in sliding contact with an inner surface of the fixing belt, and a support member that supports the fixing pad and, that may reduce the volume of the support member and thus suppress heat transfer from the fixing belt to the support member through the fixing pad, and an image forming apparatus.

A fixing device according to an aspect of the present disclosure includes: a cylindrical fixing belt; a heat source that heats the fixing belt inside the fixing belt; a fixing pad that is in sliding contact with an inner surface of the fixing belt; and a support member that supports the fixing pad, wherein the support member includes a fixture that fixes the fixing pad in a rotation axis direction of the fixing belt and an upright that is upright from a side opposite to the fixing pad between one end of the fixture on one side and the other end on the other side in a width direction orthogonal to the rotation axis direction, the fixture and the upright being integrally formed, and includes a plurality of connections between the fixture and the upright.

Further, an image forming apparatus according to the present disclosure includes the fixing device according to the present disclosure.

According to the present disclosure, it is possible to reduce the volume of the support member and thus suppress heat transfer from the fixing belt to the support member through the fixing pad.

DETAILED DESCRIPTION OF THE INVENTION

Figure 1:
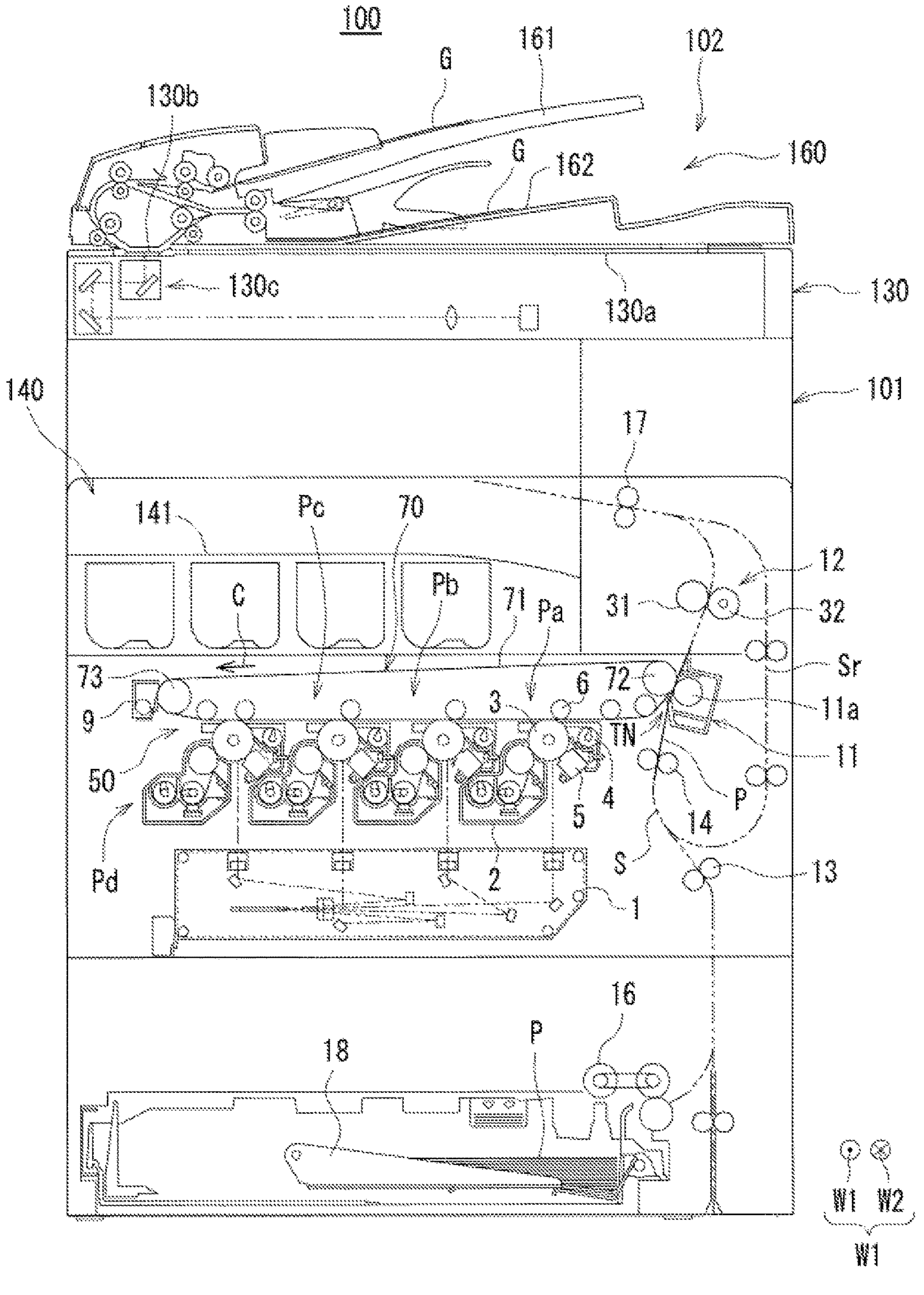
FIG. 1 is a cross-sectional view illustrating a schematic configuration of an image forming apparatus including a fixing device according to the present embodiment.

Hereinafter, aspects of the present disclosure will be described with reference to the drawings. In the following description, the same components are denoted by the same reference numerals. Their names and functions are also the same. Therefore, detailed description thereof will not be repeated.

Image Forming Apparatus

FIG. 1 is a cross-sectional view illustrating a schematic configuration of an image forming apparatus 100 including a fixing device 12 according to an aspect of the present disclosure.

As illustrated in FIG. 1, the image forming apparatus 100 is a multifunction peripheral having a copy function, a scanner function, a facsimile function, and a printer function, and transmits an image of a document G read by an image reading device 102 to the outside. Further, the image forming apparatus 100 forms an image of the document G read by the image reading device 102 or an image received from outside on a sheet P such as a recording sheet in color or monochrome. The image forming apparatus 100 may be a monochrome image forming apparatus. Further, the image forming apparatus 100 may be a color image forming apparatus of other forms.

A document feeding device 160 (automatic document conveying device) supported so as to be openable and closable with respect to an image reader 130 is provided on the upper side of the image reader 130. The image reading device 102 reads the document G conveyed by the document feeding device 160. The document feeding device 160 includes a document placement tray 161 on which the document G is placed and a document discharge tray 162 on which the discharged document G is stacked. The document feeding device 160 sequentially conveys the one or more documents G placed on the document placement tray 161 one by one onto a document reader 130*b* in the image reader 130 and discharges the documents G to the document discharge tray 162. Further, the image reader 130 includes a document placement table 130*a* on which the document G is placed. The image reading device 102 reads the document G placed on the document placement table 130*a*. In the image forming apparatus 100, when the document feeding device 160 is opened, the document placement table 130*a* above the image reader 130 is opened, and the document G may be placed by hand. The image reader 130 reads the document G conveyed by the document feeding device 160 in a state where a scanning optical system 130*c* is positioned at a reading position below the document reader 130*b* or reads the document G placed on the document placement table 130*a* by scanning the scanning optical system 130*c* to generate image data.

An image forming apparatus main body 101 includes an optical scanning device 1, a developing device 2, a photosensitive drum 3, a drum cleaning device 4, a charger 5, an intermediate transfer belt device 70, a secondary transfer device 11, a fixing device 12, a sheet conveyance path S, a sheet feed cassette 18, and a sheet discharge tray 141.

The image forming apparatus 100 handles image data corresponding to a color image using each color of black (K), cyan (C), magenta (M), and yellow (Y) or a monochrome image using a single color (for example, black). An image former 50 of the image forming apparatus 100 includes the four developing devices 2, the four photosensitive drums 3, the four drum cleaning devices 4, and the four chargers 5 to form four types of toner images, which correspond to black, cyan, magenta, and yellow, respectively, and constitute four image stations Pa, Pb, Pc, and Pd.

The charger 5 uniformly charges the surface of the photosensitive drum 3 to a predetermined potential. The optical scanning device 1 forms an electrostatic latent image by exposing the surface of the photosensitive drum 3. The developing device 2 develops the electrostatic latent image on the surface of the photosensitive drum 3 to form a toner image on the surface of the photosensitive drum 3. The drum cleaning device 4 removes and collects residual toner on the surface of the photosensitive drum 3. By the series of operations described above, a toner image of each color is formed on the surface of each of the photosensitive drums 3.

The intermediate transfer belt device 70 includes an intermediate transfer roller 6, an endless intermediate transfer belt 71, an intermediate transfer driving roller 72, an intermediate transfer driven roller 73, and a cleaning device 9. The four intermediate transfer rollers 6 are provided inside the intermediate transfer belt 71 so as to form four types of toner images corresponding to the respective colors. The intermediate transfer roller 6 transfers the toner image of each color formed on the surface of the photosensitive drum 3 to the intermediate transfer belt 71 circulating in a circulating direction C.

The intermediate transfer belt 71 is stretched around the intermediate transfer driving roller 72 and the intermediate transfer driven roller 73. In the image forming apparatus 100, the toner images of the respective colors formed on the surfaces of the respective photosensitive drums 3 are sequentially transferred and superimposed on the surface of the intermediate transfer belt 71 to form a color toner image on the surface of the intermediate transfer belt 71.

A secondary transfer device 11 forms a transfer nip TN between a secondary transfer roller 11*a* and the intermediate transfer belt 71 and conveys the sheet P conveyed through the sheet conveyance path S while sandwiching the sheet P in the transfer nip TN. When the sheet P passes through the transfer nip TN, the toner image on the surface of the intermediate transfer belt 71 is transferred to the sheet P by the secondary transfer device 11, and the sheet P is conveyed to the fixing device 12. The cleaning device 9 removes and collects waste toner remaining on the surface of the intermediate transfer belt 71 without being transferred to the sheet P.

The fixing device 12 includes a fixing belt 31 and the pressure roller 32 that rotate with the sheet P interposed therebetween. The fixing device 12 nips the sheet P on which the toner image has been transferred between the fixing belt 31 and the pressure roller 32, applies heat and pressure to the sheet P, and fixes the toner image to the sheet P. Although not illustrated in FIG. 1, the fixing device 12 includes components other than the fixing belt 31 and the pressure roller 32. Details of the fixing device 12 will be described below.

The sheet feed cassette 18 is a cassette to store the sheets P used for image formation and is provided under the optical scanning device 1. The sheet P is pulled out from the sheet feed cassette 18 by a pickup roller 16 and conveyed to the sheet conveyance path S. The sheet P conveyed to the sheet conveyance path S is conveyed to a discharge roller 17 via the secondary transfer device 11 and the fixing device 12 and is discharged to the sheet discharge tray 141 in a discharger 140. A conveyance roller 13, a registration roller 14, and the discharge roller 17 are provided in the sheet conveyance path S. The conveyance roller 13 promotes conveyance of the sheet P. The registration roller 14 temporarily stops the sheet P and aligns the leading edge of the sheet P. The registration roller 14 conveys the temporarily stopped sheet P in accordance with the timing of the toner image on the intermediate transfer belt 71.

In FIG. 1, the one sheet feed cassette 18 is provided, but the present disclosure is not limited thereto, and the plurality of sheet feed cassettes 18 may be provided, and the different types of sheets P may be stacked in the respective sheet feed cassettes 18.

Further, the image forming apparatus 100 conveys the sheet P from the discharge roller 17 to a sheet reversing path Sr in a reverse direction in a case where an image is formed not only on the front surface of the sheet P but also on the back surface thereof. The image forming apparatus 100 reverses the sheet P conveyed in the reverse direction, and guides the sheet P to the registration roller 14 again. Further, the image forming apparatus 100 forms an image on the back surface of the sheet P guided to the registration roller 14 in the same manner as the front surface, and discharges the sheet P to the sheet discharge tray 141.

Fixing Device

Figure 2A:
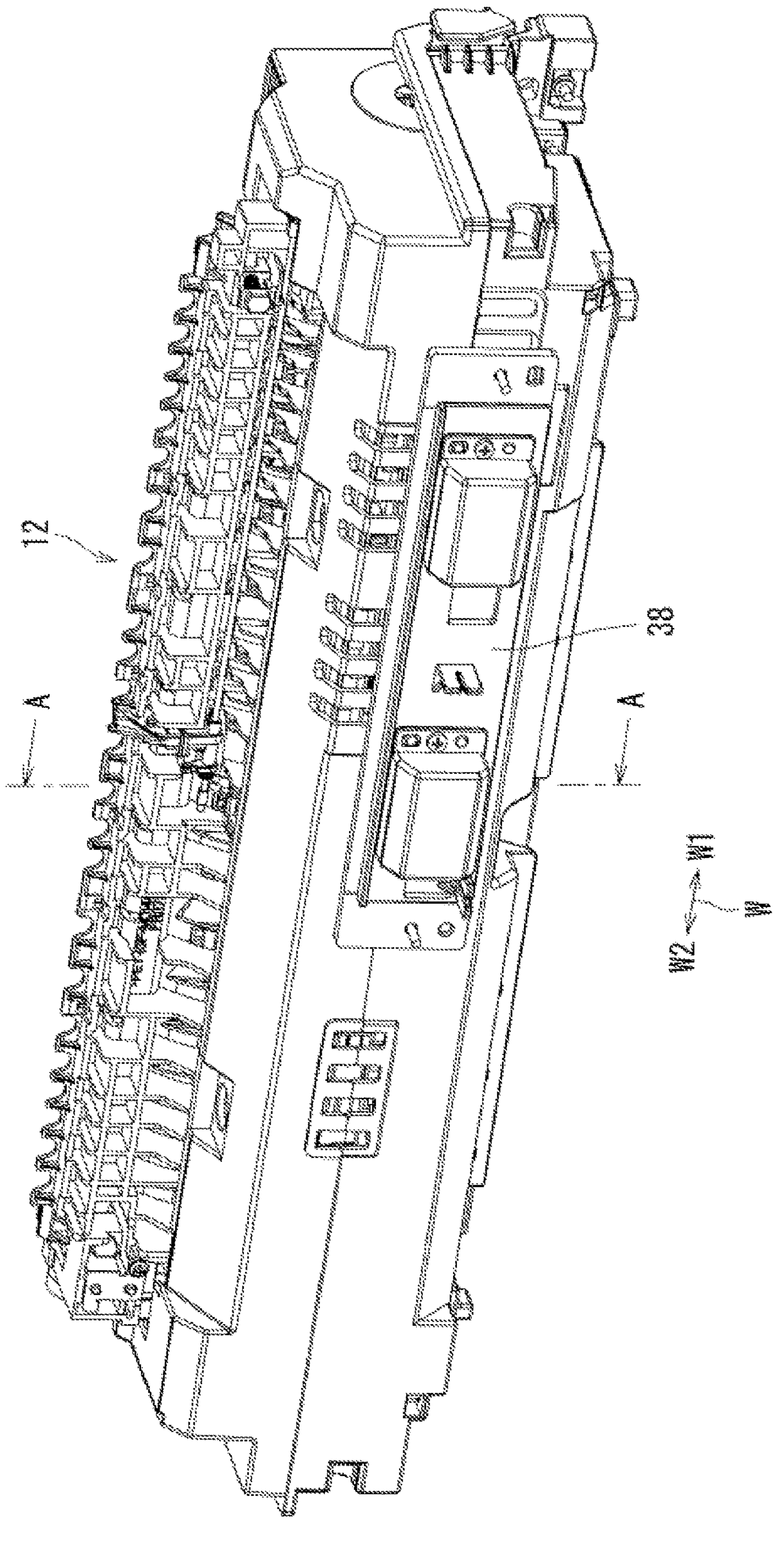
FIG. 2A is a perspective view of the fixing device in the image forming apparatus illustrated in FIG. 1.
Figure 2B:
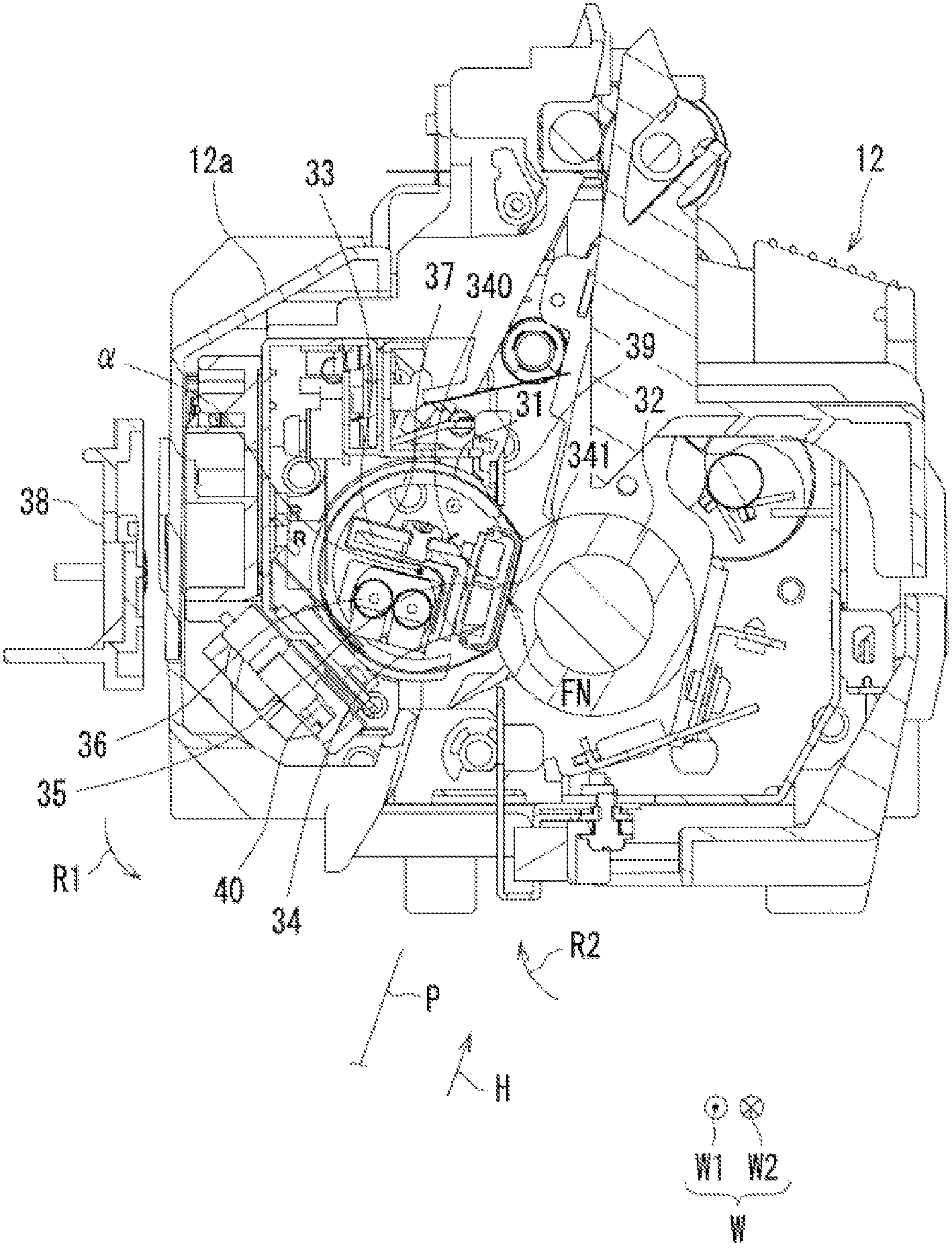
FIG. 2B is a cross-sectional view taken along the line A-A illustrated in FIG. 2A.

FIG. 2A is a perspective view of the fixing device 12 in the image forming apparatus 100 illustrated in FIG. 1. FIG. 2B is a cross-sectional view taken along the line A-A illustrated in FIG. 2A.

The fixing device 12 further includes a support member 33, a fixing pad 34, a heat source 36, a reflection member 37 (a reflection plate in this example), a temperature detector 38 (a thermopile in this example), a separation plate 39, and a thermostat 40. The support member 33, the fixing pad 34, the heat source 36, and the reflection member 37 are provided inside the fixing belt 31.

The fixing belt 31 is a cylindrical [endless (annular)] flexible belt. The fixing belt 31 is rotatable around a rotation axis α along an orthogonal direction that is orthogonal to a conveying direction H of the sheet P.

The fixing pad 34 is made of, for example, resin, and is formed into an elongated plate shape extending in a rotation axis direction W of the fixing belt 31. The fixing pad 34 includes a fixing pad main body 340 and a sliding sheet 341 provided on a surface of the fixing pad main body 340 on a side in sliding contact with the fixing belt 31. The fixing pad 34 is preferably made of a resin material having heat resistance, and for example, a heat-resistant resin material having heat resistance, such as liquid crystal polymer (LCP) or polyether ether ketone (PEEK), may be used.

The support member 33 is a member that supports the fixing pad 34. Both ends of the support member 33 in the rotation axis direction W are fixed to a fixing device main body 12*a* (main body frame). The reflection member 37 is provided on at least a surface of the support member 33 on the heat source 36 side.

The heat source 36 is a member that heats the fixing belt 31 and extends in the rotation axis direction W of the fixing belt 31. The heat source 36 may be, for example, a lamp heater such as a halogen lamp. The fixing belt 31 is heated to a predetermined fixing temperature (for example, 160° C. to 250° C., in this example, 160° C.) by the heat source 36. Therefore, not only the fixing belt 31 but also the sliding sheet 341 and the like have heat resistance to the above temperature.

The reflection member 37 is provided to cover at least the surface of the support member 33 on the heat source 36 side and is formed of a thin plate-like metal member in this example. Thus, the fixing belt 31 may be efficiently heated. The reflection member 37 is fixed to the support member 33.

The pressure roller 32 is provided at a position opposed to the fixing pad 34 with the fixing belt 31 interposed therebetween. The pressure roller 32 rotates about a rotation axis parallel to the rotation axis α of the fixing belt 31 and extends parallel to the fixing belt 31. The pressure roller 32 presses the fixing belt 31 toward the fixing pad 34 to form a fixing nip FN between the pressure roller 32 and the fixing belt 31.

A driving force from a drive source (not illustrated) such as a motor is transmitted to the pressure roller 32 via a drive transmission mechanism (not illustrated) such as a gear. The pressure roller 32 is rotationally driven by receiving the driving force from the driving source. The fixing belt 31 is driven to rotate in a first rotation direction R1 opposite to a second rotation direction R2 of the pressure roller 32 in accordance with the rotational driving of the pressure roller 32. That is, the pressure roller 32 forms the fixing nip FN by coming into contact with the surface of the fixing belt 31 and transmits a driving force to the fixing belt 31 via the fixing nip FN to drive and rotate the fixing belt 31.

The temperature detector 38 detects the surface temperature of the fixing belt 31. In the fixing device 12, the temperature of the heat source 36 is controlled based on the temperature detected by the temperature detector 38 so that the fixing belt 31 has a fixing temperature (160° C. in this example). In this example, the temperature detector 38 is fixed to the image forming apparatus main body 101 (main body frame) (see FIG. 1). The temperature detector 38 detects the surface temperature of the fixing belt 31 in a non-contact manner.

The separation plate 39 is provided in the vicinity of the downstream side of the fixing nip FN in the first rotation direction R1 of the fixing belt 31 and prevents the sheet P from winding around the fixing belt 31.

The thermostat 40 cuts off power supply to the heat source 36 when the heat source 36 is abnormally heated. Specifically, the thermostat 40 is electrically connected to a power line (not illustrated) for supplying power to the heat source 36 and directly cuts off the power supply to the heat source 36. The thermostat 40 is fixed to the fixing device main body 12*a* (main body frame). When a predetermined reaction temperature (operating temperature, rated temperature) is obtained, the thermostat 40 operates to cut off the power supply to the heat source 36.

First Embodiment

Figure 3A:
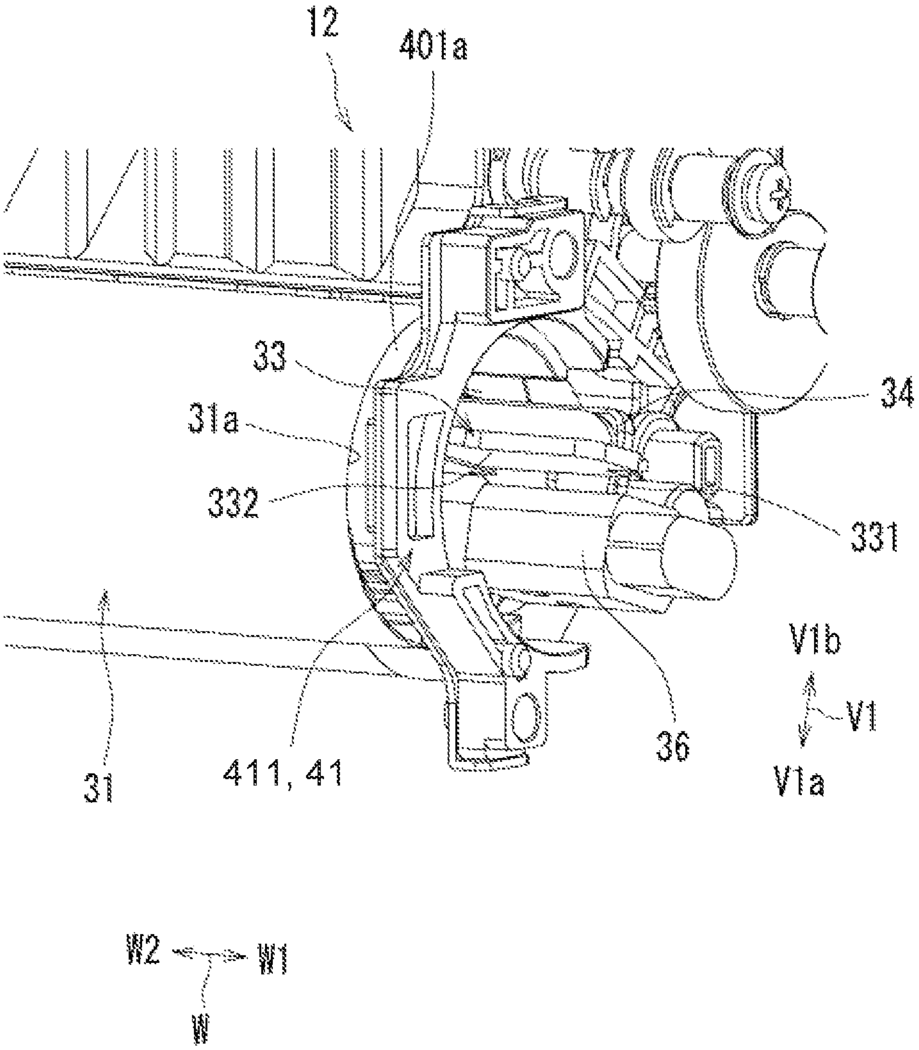
FIG. 3A is a perspective view of an end part on one side in a rotation axis direction of a fixing belt of the fixing device according to the present embodiment as viewed from the front side.
Figure 3B:
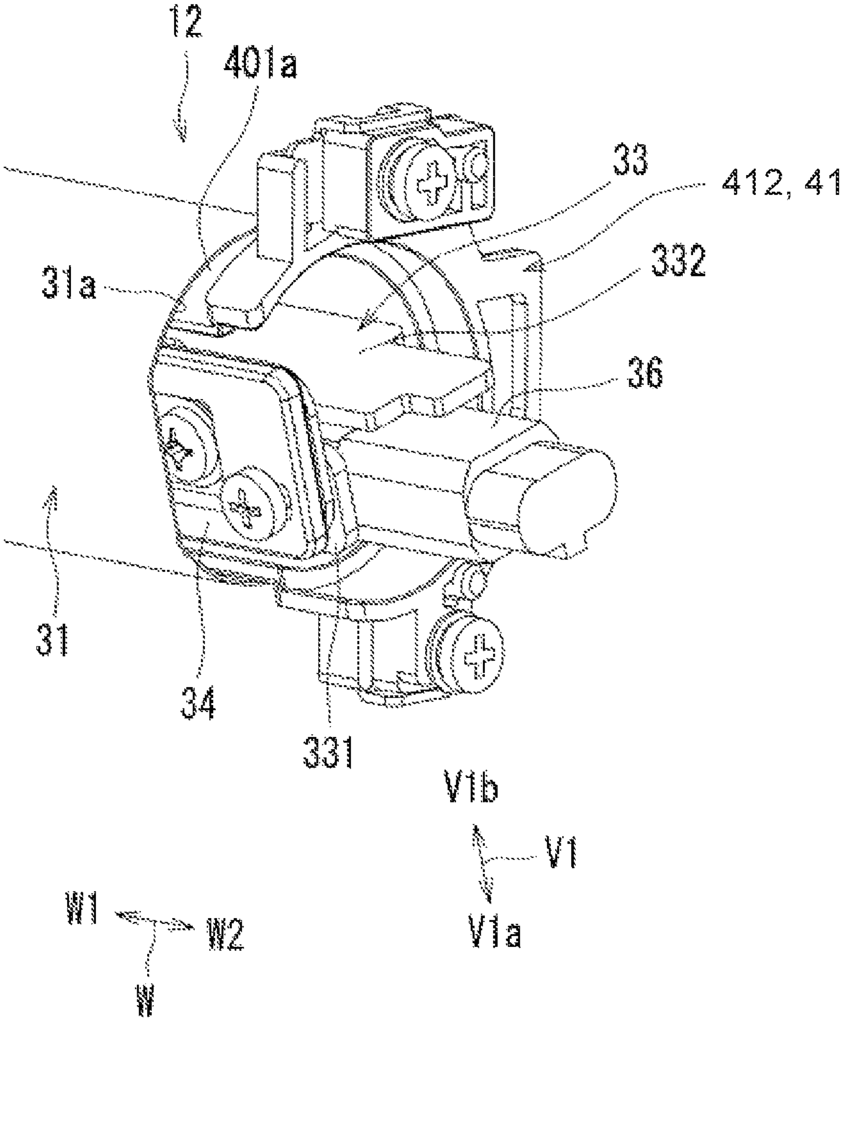
FIG. 3B is a perspective view of an end part on the other side in the rotation axis direction of the fixing belt of the fixing device according to the present embodiment as viewed from the back side.
Figure 4:
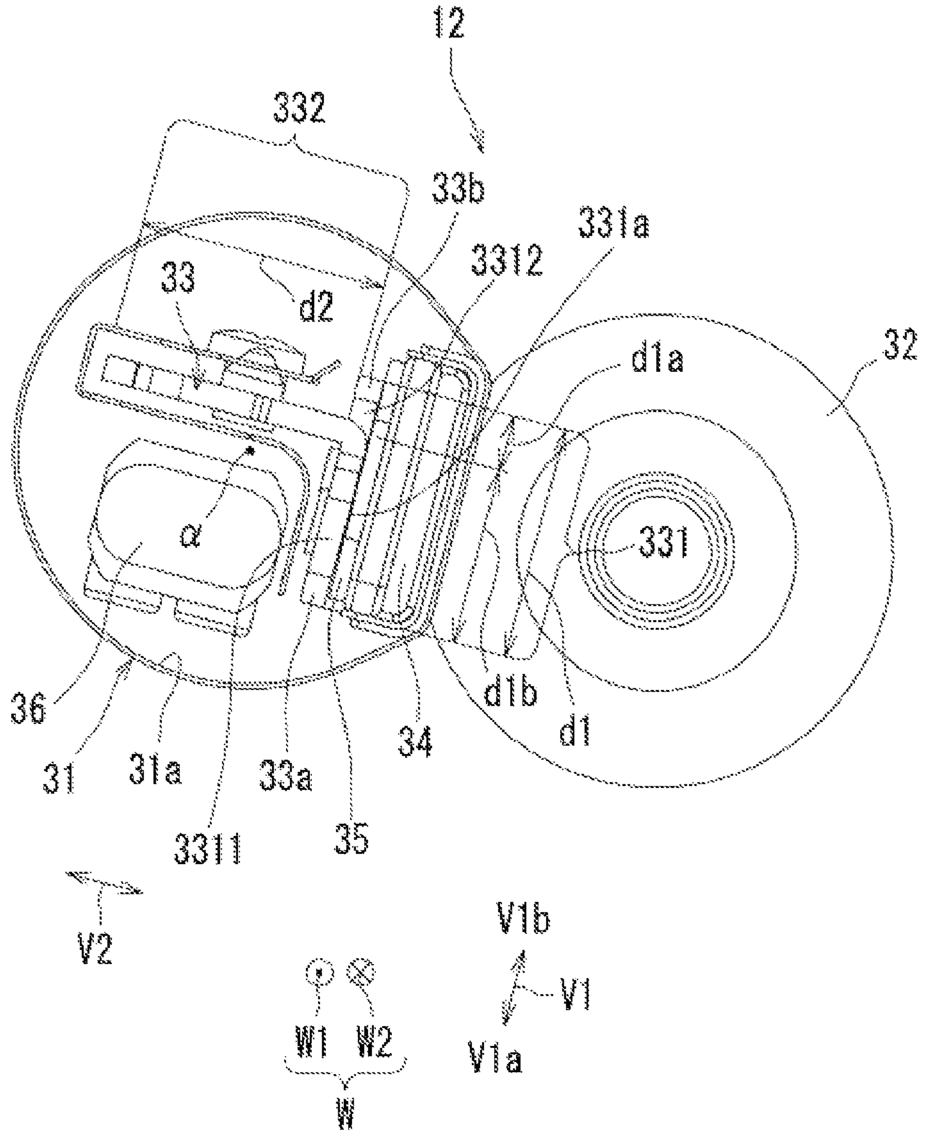
FIG. 4 is a front view illustrating an example of a main part of the fixing device.
Figure 5A:
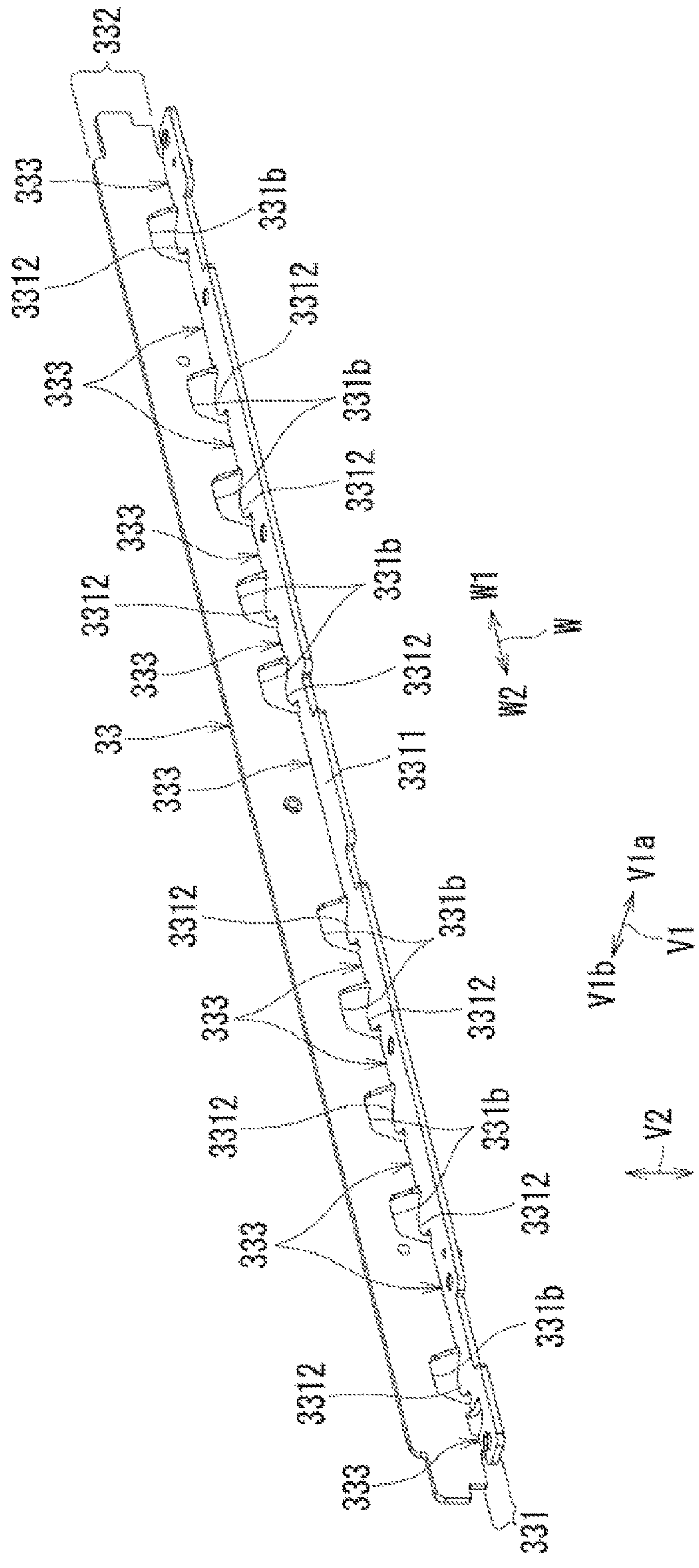
FIG. 5A is a perspective view illustrating an example of a support member in the fixing device.
Figure 5B:
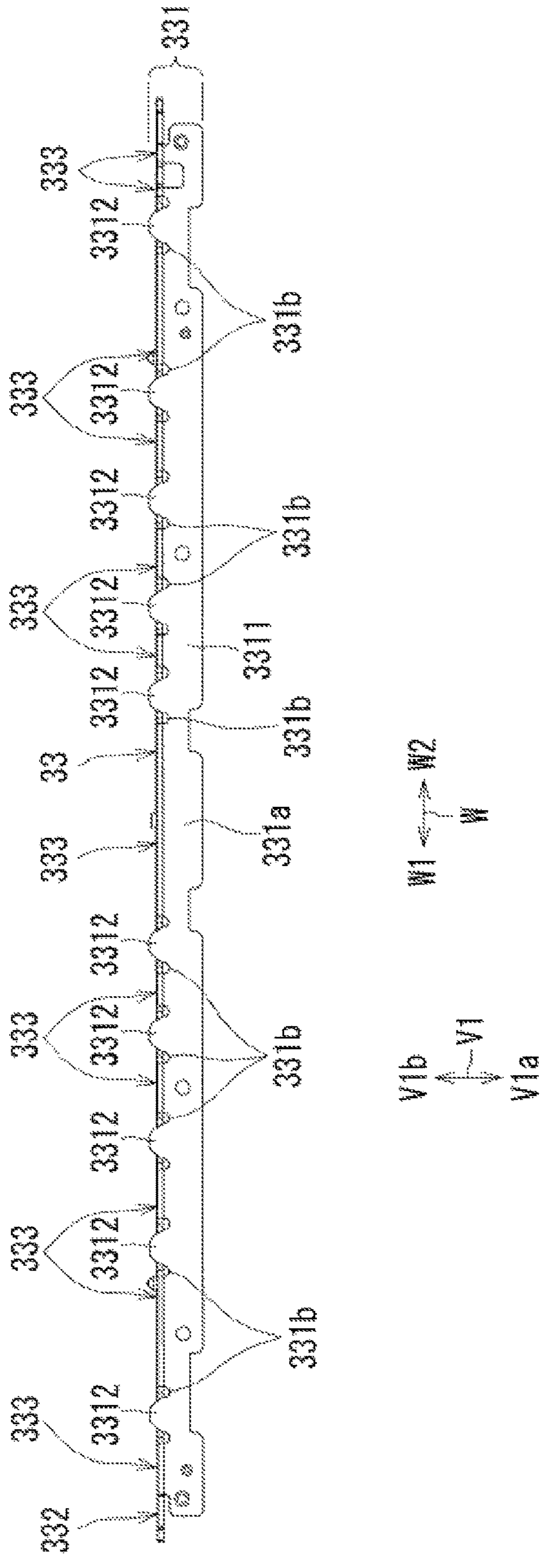
FIG. 5B is a bottom view illustrating an example of the support member in the fixing device.

FIGS. 3A and 3B are perspective views of end parts on one side W1 and the other side W2 in the rotation axis direction W of the fixing belt 31 of the fixing device 12 according to the present embodiment as viewed from the front side and the back side, respectively. FIG. 4 is a front view illustrating an example of a main part of the fixing device 12. FIGS. 5A and 5B are a perspective view and a bottom view illustrating an example of the support member 33 in the fixing device 12, respectively.

As illustrated in FIGS. 3A and 3B, the fixing device 12 includes a pair of holding members 411 and 412 (41) (belt guide members) and the fixing belt 31 provided on an outer peripheral surface 401*a* of the pair of holding members 411 and 412 (41) so as to be rotatable about the rotation axis α (see FIG. 2B). The pair of holding members 411 and 412 (41) are fixed to the fixing device main body 12*a* (main body frame) (see FIG. 2B).

The pair of holding members 411 and 412 (41) hold both ends of the inner surface 31*a* of the fixing belt 31 in the rotation axis direction W. Of the pair of holding members 411 and 412 (41), the one holding member 411 holds the end on the one side W1 (the front side, the operating side) in the rotation axis direction W of the inner surface 31*a* of the fixing belt 31, and the other holding member 412 holds the end on the other side W2 (the back side) in the rotation axis direction W of the inner surface 31*a* of the fixing belt 31.

As illustrated from FIGS. 3A to 5B, the fixing device 12 includes the cylindrical fixing belt 31, the heat source 36 that is provided inside the fixing belt 31 to heat the fixing belt 31, the fixing pad 34 that is provided inside the fixing belt 31 and is in sliding contact with the inner surface 31*a* of the fixing belt 31, and the support member 33 that supports the fixing pad 34. The fixing belt 31, the heat source 36, the fixing pad 34, and the support member 33 are members elongated in the rotation axis direction W.

In the support member 33, a fixture 331 and an upright 332 are integrally formed. The fixture 331 fixes the fixing pad 34 in the rotation axis direction W of the fixing belt 31. The upright 332 is upright from the side opposite to the fixing pad 34 between one end 33*a* (see FIG. 4) of the fixture 331 on one side V1*a* and the other end 33*b* (see FIG. 4) on the other side V1*b* in a width direction V1 orthogonal to the rotation axis direction W. The upright 332 extends in the rotation axis direction W. A plurality of connections 333 (see FIGS. 5A and 5B) between the fixture 331 and the upright 332 is provided. Specifically, a space [one or a plurality of (in this example, a plurality of) openings (in this example, through-holes 331*b* to 331*b*)] is provided between the adjacent connections 333 to 333.

According to the present embodiment, in the support member 33, the fixture 331 and the upright 332 are integrally formed, and the two supports are not overlapped with each other as in the configuration of the related art, and therefore, it is possible to reduce the volume of the support member 33 and thus suppress heat transfer from the fixing belt 31 to the support member 33 through the fixing pad 34. Specifically, the upright 332 may be formed integrally (as a single piece) so that the volume of the upright 332 may be reduced, and the heat capacity of the support member 33 may be reduced accordingly. In addition, in the support member 33, since the plurality of connections 333 to 333 between the fixture 331 and the upright 332 is provided, it is possible to shorten the entire lengths of the connections 333 to 333 in the rotation axis direction W by the space (331*b* to 331*b*) provided between the adjacent connections 333 and 333. Thus, it is possible to make it difficult for heat to shift from the fixture 331 to the upright 332.

Therefore, it is possible to suppress heat transfer from the fixing belt 31 to the support member 33 through the fixing pad 34. As a result, the thermal energy transmitted from the heat source 36 to the fixing belt 31 may be reduced, and the power consumption may be reduced accordingly.

Further, since the fixture 331 and the upright 332 are integrally formed, the configuration of the support member 33 may be simplified.

Moreover, since the support member 33 is upright between the one end 33*a* and the other end 33*b* of the fixture 331 in the width direction V1, the fixture 331 pressed by the pressure roller 32 may be supported by the support member 33, for example, as compared with a case where the support member 33 is upright (cantilevered) from the one end 33*a* or the other end 33*b* of the fixture 331 in the width direction V1.

According to the present embodiment, in the support member 33, the fixture 331 and the upright 332 are formed into a T-shape in a front view by bending a single plate (sheet metal) (by bending process). Specifically, the connections 333 to 333 are bends. The upright 332 is formed at a right angle or a substantially right angle with respect to the fixture 331. A width d2 (see FIG. 4) (height) of the upright 332 in a width direction V2 orthogonal to the rotation axis direction W is equal to or larger than (in this example, larger than) a width d1 (see FIG. 4) of the fixture 331 in the width direction V1 orthogonal to the rotation axis direction W.

With this configuration, since the support member 33 is formed by bending a single plate, it is possible to reduce the number of parts, and thus improve the part accuracy of the support member 33, and in addition, it is possible to reduce the volume of the support member 33, and thus suppress heat transfer from the fixing belt 31 to the support member 33 through the fixing pad 34. In addition, it is possible to secure a space inside the fixing belt 31, or it is possible to reduce the diameter of the fixing belt 31 and thus reduce the size of the fixing device.

According to the present embodiment, an opposed surface 331*a* (see FIGS. 4 and 5B) of the fixture 331 opposed to the fixing pad 34 is formed into a planar shape.

With this configuration, the fixture 331 may be fixed to the fixing pad 34 with the planar opposed surface 331*a* provided on the fixture 331 itself.

According to the present embodiment, the upright 332 includes through-holes 331*b* to 331*b* adjacent to the connections 333 to 333, and the fixture 331 includes a fixture main body 3311 (see FIGS. 5A and 5B) closer to the one side V1*a* than the upright 332 in the width direction V1 and protrusions 3312 to 3312 that protrude from the end on the other side V1*b* in the width direction V1 toward the other side V1*b* beyond the upright 332 at the positions corresponding to the through-holes 331*b* to 331*b* (see FIGS. 5A and 5B) in the fixture main body 3311. Specifically, the protrusions 3312 to 3312 are parts of the portions that are not bent as the upright 332 in the single plate forming the support member 33 and remains in the fixture 331.

With this configuration, the volume of the support member 33 may be reduced by the through-holes 331*b* to 331*b*, and the heat capacity of the support member 33 may be reduced accordingly. Thus, it is possible to suppress heat transfer from the fixing belt 31 to the support member 33 through the fixing pad 34. Therefore, the thermal energy transmitted from the heat source 36 to the fixing belt 31 may be reduced, and the power consumption may be reduced accordingly.

Specifically, in the individual through-holes 331*b* to 331*b*, the one protrusion 3312 is formed for the one through-hole 331*b*. One end and the other end of the protrusion 3312 in the rotation axis direction W are respectively positioned near one end and the other end of the through-hole 331*b* in the rotation axis direction W. In this way, the protrusions 3312 to 3312 may be easily formed, and the support member 33 may be easily manufactured accordingly.

In the fixture 331, a length d1*a* (see FIG. 4) of the protrusions 3312 to 3312 in the width direction V1 is smaller than a length d1*b* (see FIG. 4) of the fixture main body 3311 in the width direction V1. Thus, it is possible to easily bend the fixture main body 3311, and accordingly, it is possible to easily manufacture the support member 33.

Second Embodiment

Figure 6:
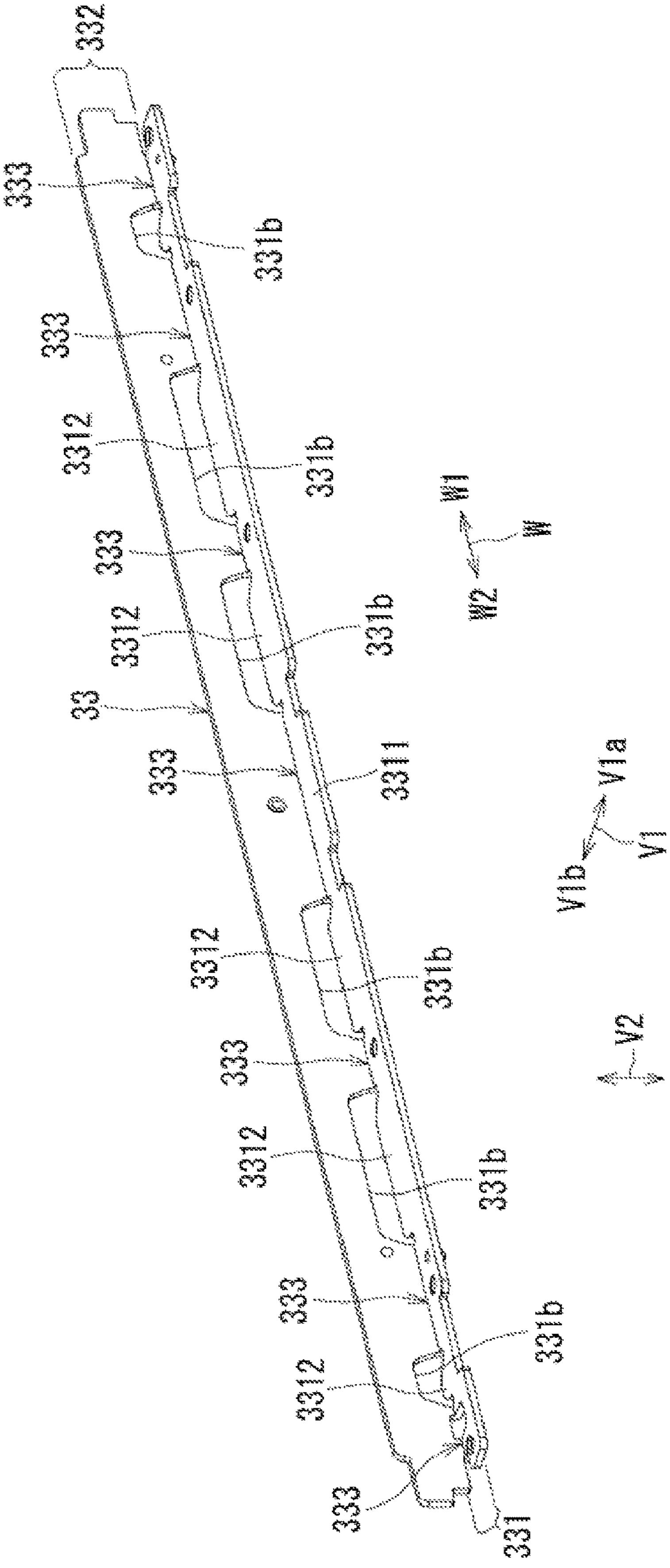
FIG. 6 is a perspective view illustrating another example of the support member in the fixing device.

FIG. 6 is a perspective view illustrating another example of the support member 33 in the fixing device 12.

According to the second embodiment, substantially the same components as those of the first embodiment are denoted by the same reference numerals, and the description thereof will be omitted.

In the support member 33 according to the second embodiment, the numbers of the protrusions 3312 to 3312 and the through-holes 331*b* to 331*b* in the support member 33 according to the first embodiment are reduced, and the lengths of the protrusions 3312 to 3312 and the through-holes 331*b* to 331*b* in the rotation axis direction W are increased. One end and the other end of the protrusion 3312 in the rotation axis direction W are respectively positioned near one end and the other end of the through-hole 331*b* in the rotation axis direction W.

With this configuration, the volume of the support member 33 may be further reduced by the through-holes 331*b* to 331*b*, and the heat capacity of the support member 33 may be reduced accordingly. Thus, the heat transfer from the fixing belt 31 to the support member 33 through the fixing pad 34 may be further suppressed. Therefore, the thermal energy transmitted from the heat source 36 to the fixing belt 31 may be further reduced, and the power consumption may be reduced accordingly.

Third Embodiment

Figure 7:
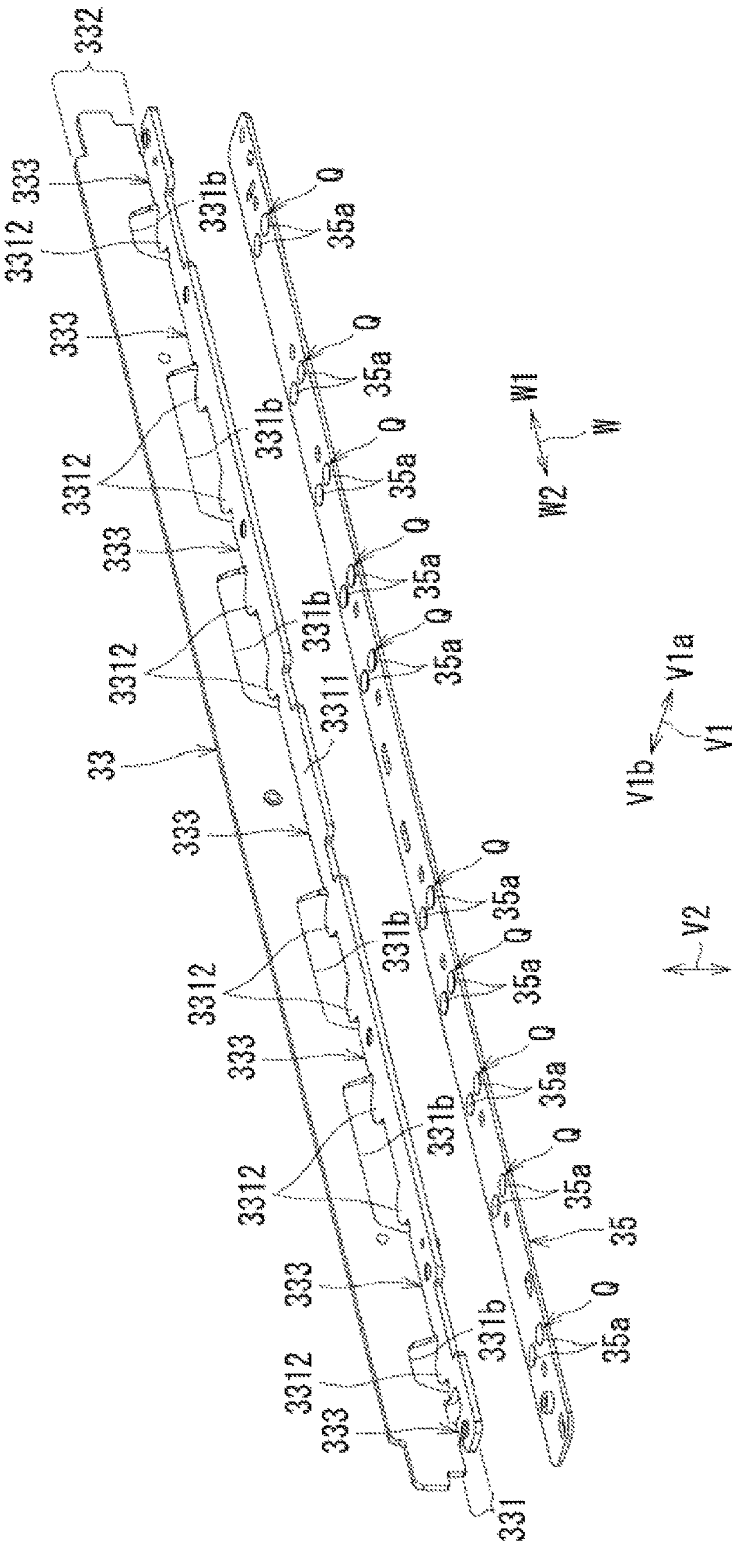
FIG. 7 is a perspective view illustrating still another example of the support member in the fixing device.
Figure 8:
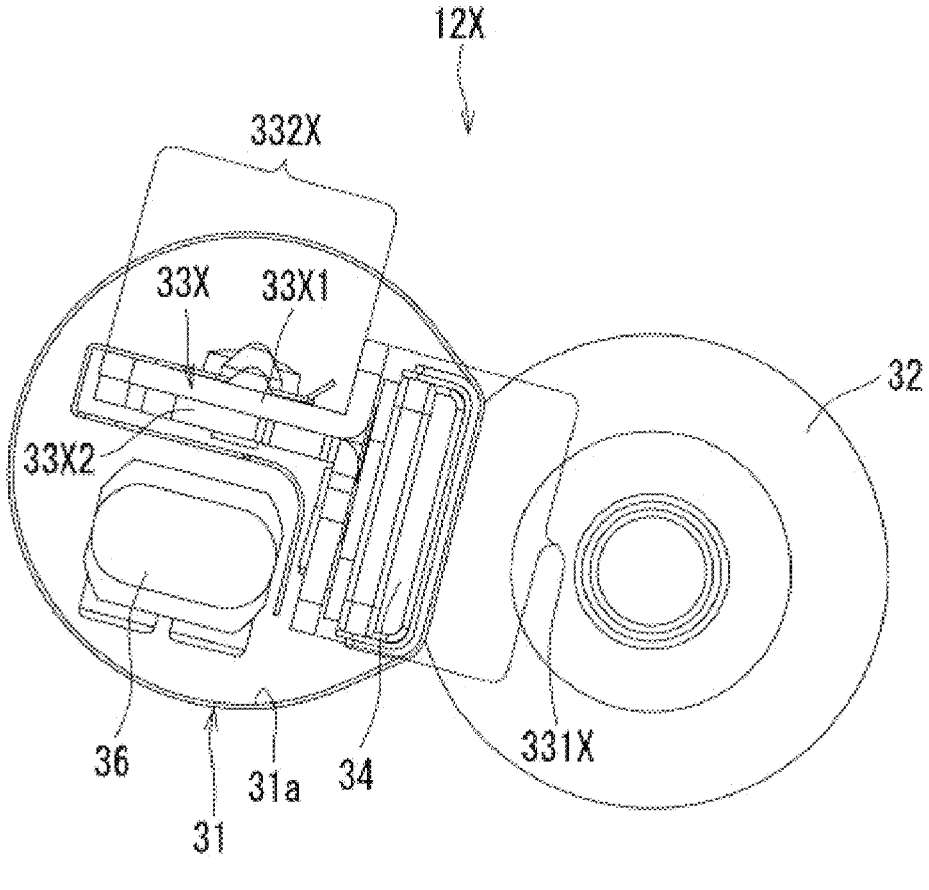
FIG. 8 (Prior Art)
FIG. 8 is a front view illustrating an example of a main part of a conventional fixing device.
Figure 9A:
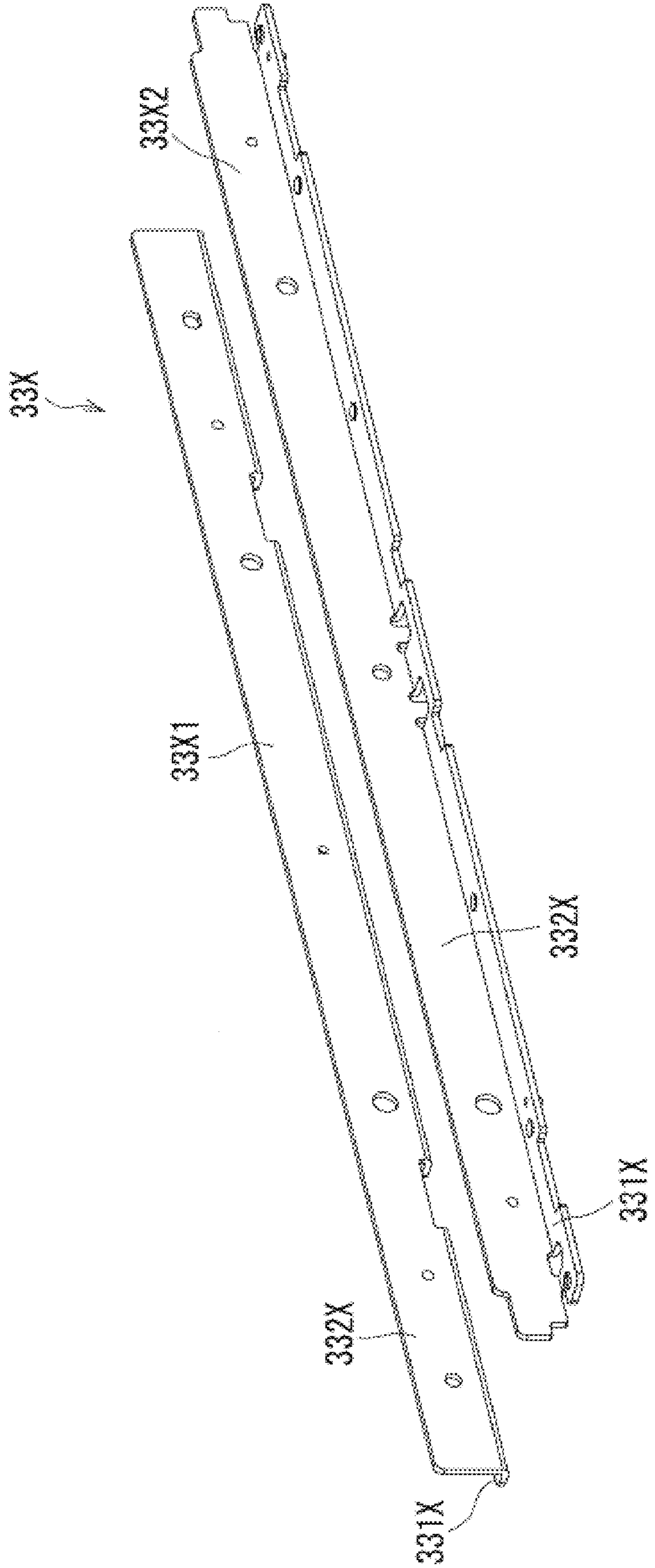
FIG. 9A (Prior Art)
FIG. 9A is an exploded perspective view illustrating an example of a support member in the conventional fixing device.
Figure 9B:
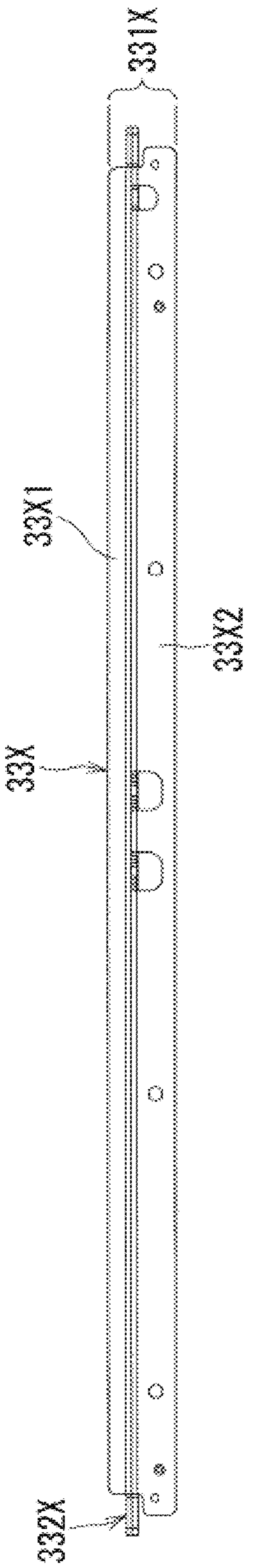
FIG. 9B (Prior Art)
FIG. 9B is a bottom view illustrating an example of the support member in the conventional fixing device.

FIG. 7 is a perspective view illustrating still another example of the support member 33 in the fixing device 12.

According to the present embodiment, an interposition member 35 (see FIGS. 4 and 7) interposed between the fixture 331 of the support member 33 and the fixing pad 34 is further provided. The interposition member 35 is a pad fixing member (sheet metal) for fixing the fixing pad 34 and is a member elongated in the rotation axis direction W.

The fixing pad 34 may warp in the width direction V1, and in this case, the interposition member 35 may warp along with the warp of the fixing pad 34. Then, a gap is formed between the interposition member 35 and the fixture 331 of the support member 33. In this case, it is difficult to support the fixing pad 34 by the support member 33 through the interposition member 35.

In this regard, a plurality of projections 35*a* to 35*a*, which projects to the fixture 331 side and comes into contact with the fixture 331, is provided on the interposition member 35 on the fixture 331 side. The protrusions 3312 to 3312 are provided at positions Q to Q corresponding to the projections 35*a* to 35*a* in the fixture main body 3311. Specifically, the plurality of (two in this example) projections 35*a* to 35*a* is arranged in a row in the width direction V1 at each of the positions Q to Q. Thus, the fixing pad 34 may be supported by the support member 33 through the interposition member 35.

In addition, since the interposition member 35 includes the plurality of projections 35*a* to 35*a*, the heat transfer from the fixing pad 34 to the support member 33 may be suppressed, and therefore, the heat energy transmitted from the heat source 36 to the fixing belt 31 may be reduced, and the power consumption may be reduced accordingly.

As the protrusions 3312 to 3312 are provided at the positions Q to Q corresponding to the projections 35*a* to 35*a* in this manner, the positions where the projections 35*a* to 35*a* of the interposition member 35 are in contact with the fixture 331 may be ensured in the protrusions 3312 to 3312.

Specifically, in the individual through-holes 331*b* to 331*b*, the plurality of (two in this example) protrusions 3312, 3312 is formed for the one through-hole 331*b*. The plurality of protrusions 3312 and 3312 in each of the through-holes 331*b* to 331*b* is provided at intervals in the rotation axis direction W. In this way, the volume of the support member 33 may be further reduced by the through-holes 331*b* to 331*b*, and the heat capacity of the support member 33 may be further reduced accordingly.

The present disclosure is not limited to the embodiments described above and may be implemented in various other forms. Therefore, the embodiments are merely examples in all respects, and should not be interpreted in a limited manner. The scope of the present disclosure is defined by the appended claims and is not limited by the description of the specification. Furthermore, all modifications and changes belonging to the equivalent scope of the claims are within the scope of the present disclosure.

What is claimed is:

1. A fixing device comprising:

a cylindrical fixing belt;

a heat source, that heats the cylindrical fixing belt, located inside the cylindrical fixing belt;

a fixing pad that is in sliding contact with an inner surface of the cylindrical fixing belt; and a support member that supports the fixing pad, wherein the support member includes a fixture that fixes the fixing pad in a rotational axis direction of the cylindrical fixing belt and an upright that is upright from a side opposite the fixing pad between one end of the fixture on one side and the other end of the fixture on the other side in a width direction orthogonal to the rotational axis direction, the fixture and the upright being integrally formed, the support member further includes a plurality of connections between the fixture and the upright, in the support member, the fixture and the upright are formed into a T-shape in a front view by bending a single plate, an opposed surface of the fixture opposite the fixing pad is formed into a planar shape, the upright includes a through-hole between adjacent ones of the plurality of connections, and the fixture includes a fixture main body closer to the one side than to the upright in the width direction, and a protrusion that protrudes from an end on the other side in the width direction toward a side beyond the upright, the protrusion being provided, in the fixture main body, at a position corresponding to the through-hole provided in the upright, the protrusion is a part of a portion that is not bent as the upright in the single plate of the support member and that remains in the fixture, and one end and the other end of the protrusion in the rotational axis direction are, respectively, positioned near one end and the other end of the through-hole in the rotational axis direction.

2. The fixing device according to claim 1, further comprising an interposition member interposed between the fixture of the support member and the fixing pad, wherein a plurality of projections that projects toward the fixture is provided on the interposition member on a fixture side, and the protrusion is further provided at a position corresponding to the plurality of projections provided on the interposition member, the interposition member being a pad fixing member for fixing the fixing pad.

3. An image forming apparatus comprising the fixing device according to claim 1.

* * * * *